US010129335B2

(12) United States Patent
Mabey et al.

(10) Patent No.: US 10,129,335 B2
(45) Date of Patent: Nov. 13, 2018

(54) METHOD AND SYSTEM FOR DYNAMIC GROUP CREATION IN A COLLABORATION FRAMEWORK

(71) Applicant: QuirkLogic, Inc., Calgary (CA)

(72) Inventors: Michael Howatt Mabey, Calgary (CA); Kenneth James Horemans, Calgary (CA); Alfonso Fabian de la Fuente, Victoria (CA); Nashirali Samanani, Calgary (CA)

(73) Assignee: QUIRKLOGIC, INC., Calgary (CA)

( * ) Notice: Subject to any disclaimer, the term of this patent is extended or adjusted under 35 U.S.C. 154(b) by 216 days.

(21) Appl. No.: 15/174,641

(22) Filed: Jun. 6, 2016

(65) Prior Publication Data

US 2017/0195411 A1 Jul. 6, 2017

Related U.S. Application Data

(60) Provisional application No. 62/275,052, filed on Jan. 5, 2016.

(51) Int. Cl.
*G06F 15/16* (2006.01)
*H04L 29/08* (2006.01)
*H04L 29/06* (2006.01)

(52) U.S. Cl.
CPC ...... *H04L 67/1044* (2013.01); *H04L 65/4015* (2013.01); *H04L 65/4038* (2013.01)

(58) Field of Classification Search
CPC ............ H04L 67/1044; H04L 65/4015; H04L 65/4038
USPC ......................................................... 709/206
See application file for complete search history.

(56) References Cited

U.S. PATENT DOCUMENTS

| 8,090,366 B2 | 1/2012 | McNamara et al. |
| 8,473,851 B2 | 6/2013 | DeGrazia |
| 8,826,147 B2 * | 9/2014 | Sitrick .................. G06F 17/241 715/738 |

(Continued)

FOREIGN PATENT DOCUMENTS

| JP | 2015-191487 A | 11/2015 |
| TW | 201443822 A | 11/2014 |

OTHER PUBLICATIONS

International Search Report and Written Opinion for PCT/CA2016/051541 dated Feb. 14, 2017. (10 pages).

(Continued)

*Primary Examiner* — Kristie D Shingles
(74) *Attorney, Agent, or Firm* — Chamberlain, Hrdlicka, White, Williams, & Aughtry

(57) ABSTRACT

In general, embodiments of the invention relate to a method for transmitting messages. The method includes determining that a first device and a second device are members of a communication group based on the first device and the second device concurrently accessing a file, receiving a message from the first device, making a first determination, in response to receiving the message, that the first device is a member of the communication group, and based on the first determination, making a second determination that the second device is a member of the communication group, and based on the second determination, transmitting a second message to the second device, wherein the second message is generated, based at least in part, on the message.

18 Claims, 21 Drawing Sheets

(56) References Cited

U.S. PATENT DOCUMENTS

| | | |
|---|---|---|
| 9,575,712 B2 | 2/2017 | Farouki |
| 9,740,361 B2 | 8/2017 | Tan et al. |
| 2002/0157880 A1 | 10/2002 | Atwood et al. |
| 2003/0007683 A1 | 1/2003 | Wang et al. |
| 2003/0179214 A1 | 9/2003 | Saund et al. |
| 2005/0091289 A1 | 4/2005 | Shappell et al. |
| 2006/0028457 A1 | 2/2006 | Burns |
| 2007/0044028 A1 | 2/2007 | Dunn et al. |
| 2007/0124737 A1 | 5/2007 | Wensley et al. |
| 2008/0046372 A1 | 2/2008 | Lutnick et al. |
| 2008/0114844 A1 | 5/2008 | Sanchez et al. |
| 2008/0123976 A1 | 5/2008 | Coombs et al. |
| 2008/0231635 A1 | 9/2008 | Saund |
| 2009/0019113 A1* | 1/2009 | Wu .................... H04L 12/1881 709/204 |
| 2009/0106093 A1 | 4/2009 | Folgner et al. |
| 2009/0273585 A1 | 11/2009 | De Haan et al. |
| 2010/0257239 A1 | 10/2010 | Roberts |
| 2012/0131113 A1 | 5/2012 | Chen et al. |
| 2012/0206330 A1 | 8/2012 | Cao et al. |
| 2012/0254773 A1 | 10/2012 | Viswanathan |
| 2013/0091209 A1* | 4/2013 | Bennett .................. H04W 4/21 709/204 |
| 2013/0091440 A1 | 4/2013 | Kotler et al. |
| 2013/0321340 A1 | 12/2013 | Seo et al. |
| 2014/0111416 A1 | 4/2014 | Sugiura |
| 2014/0222916 A1 | 8/2014 | Foley et al. |
| 2014/0258901 A1 | 9/2014 | Cho |
| 2014/0344053 A1 | 11/2014 | Yang et al. |
| 2015/0109546 A1 | 4/2015 | Tai et al. |
| 2015/0146985 A1 | 5/2015 | Nakasu et al. |

OTHER PUBLICATIONS

International Search Report issued in corresponding Application No. PCT/CA2017/051330, dated Feb. 12, 2018 (3 pages).

Written Opinion issued in corresponding Application No. PCT/CA2017/051330, dated Feb. 12, 2018 (7 pages).

Examination Notification issued in corresponding Taiwan Application No. 103107055, dated Jan. 10, 2018 (23 pages).

* cited by examiner

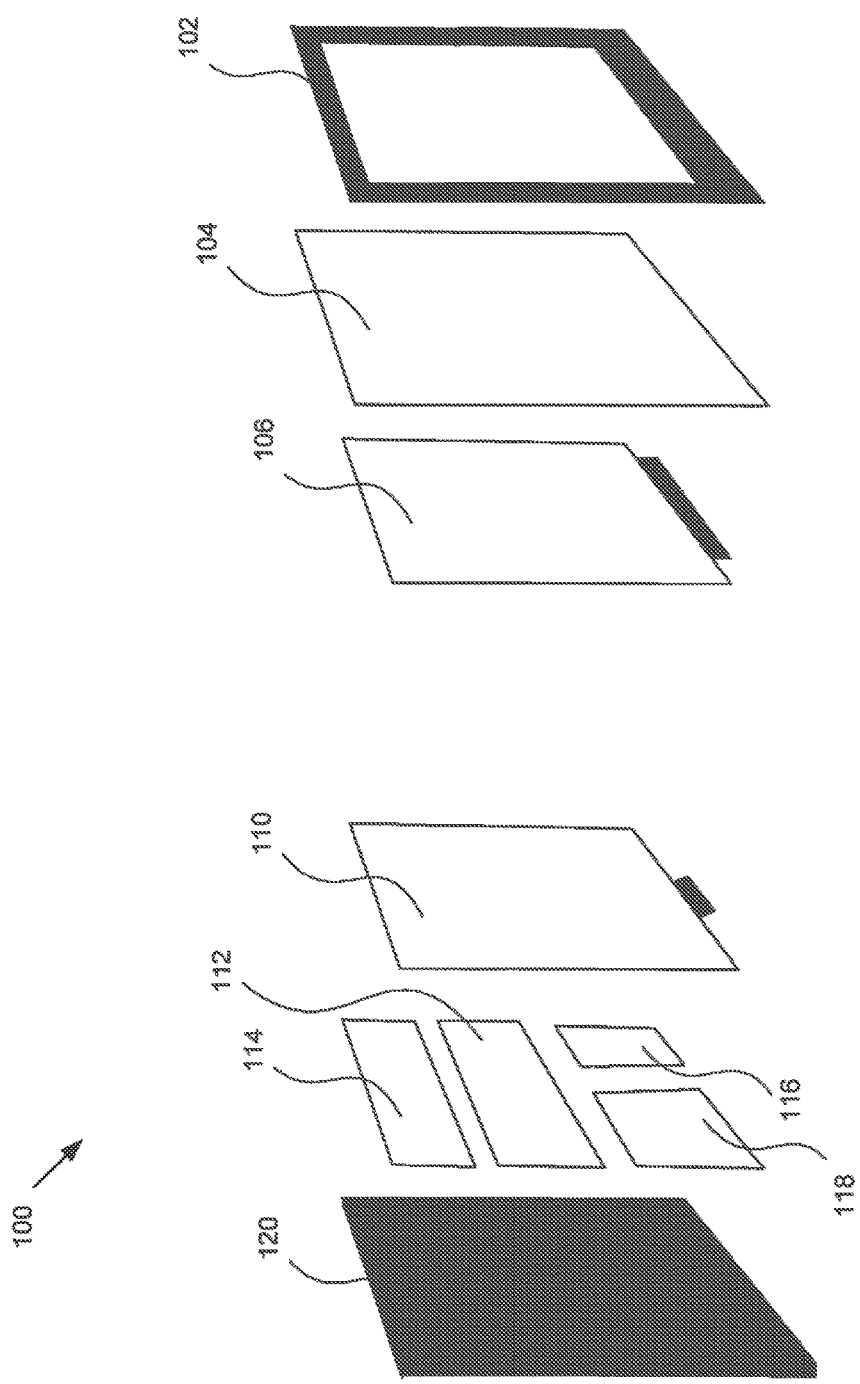

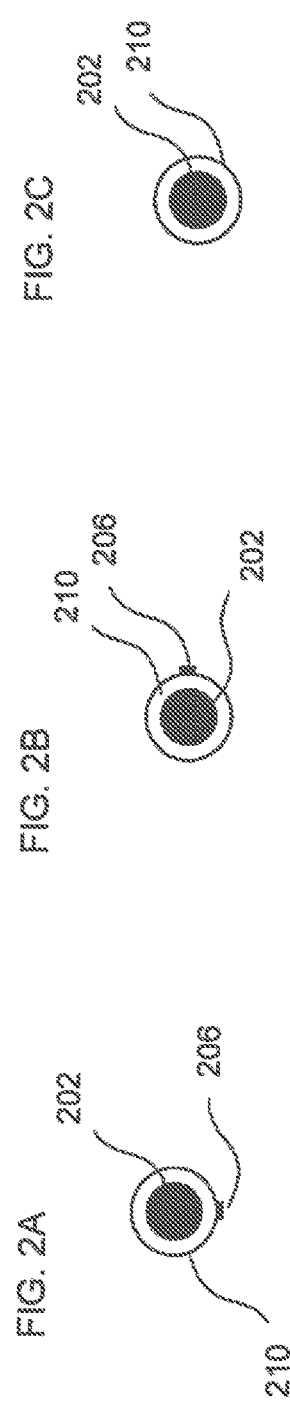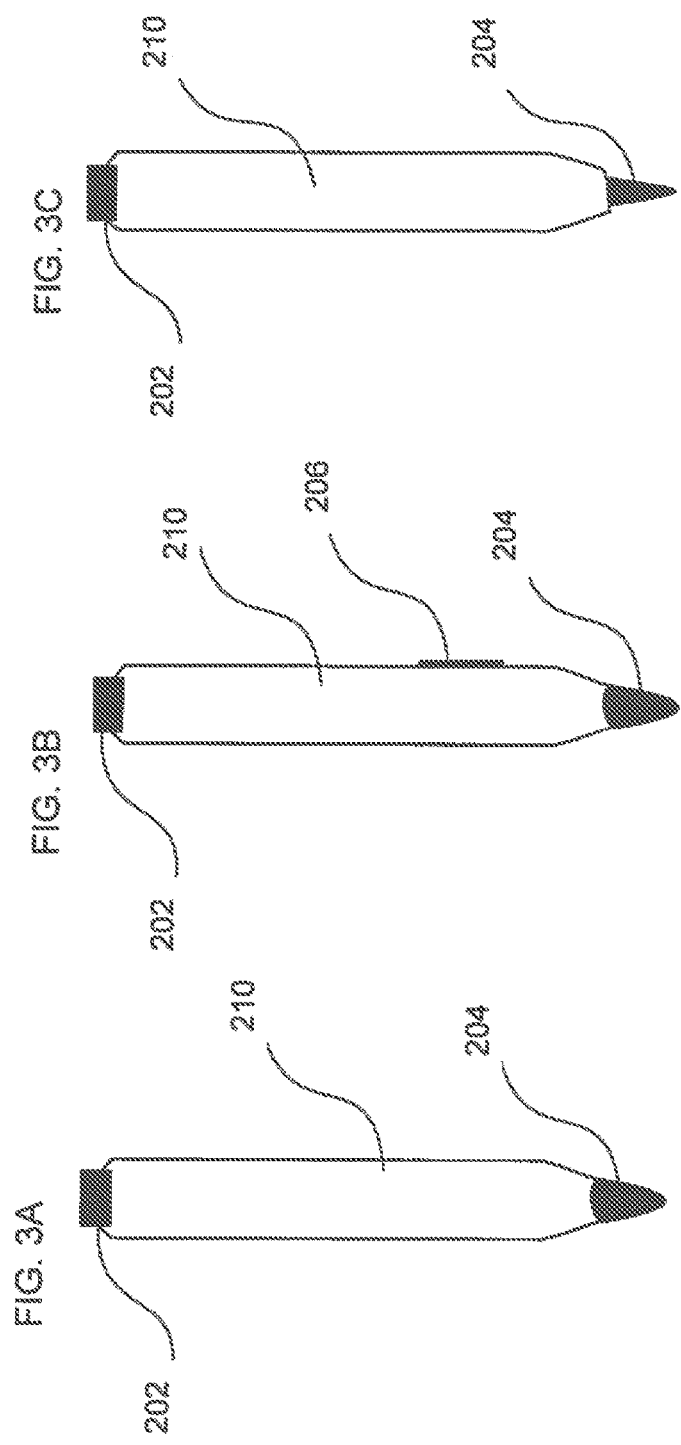

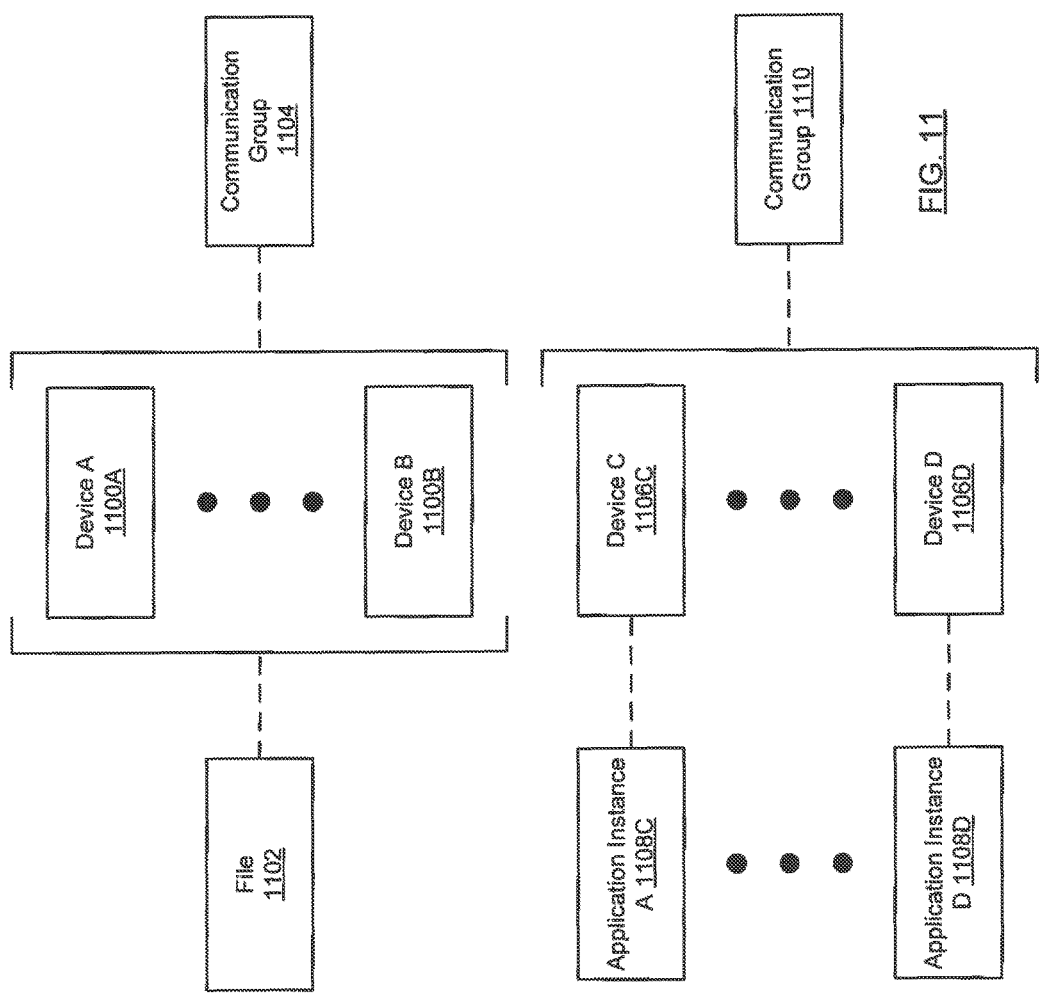

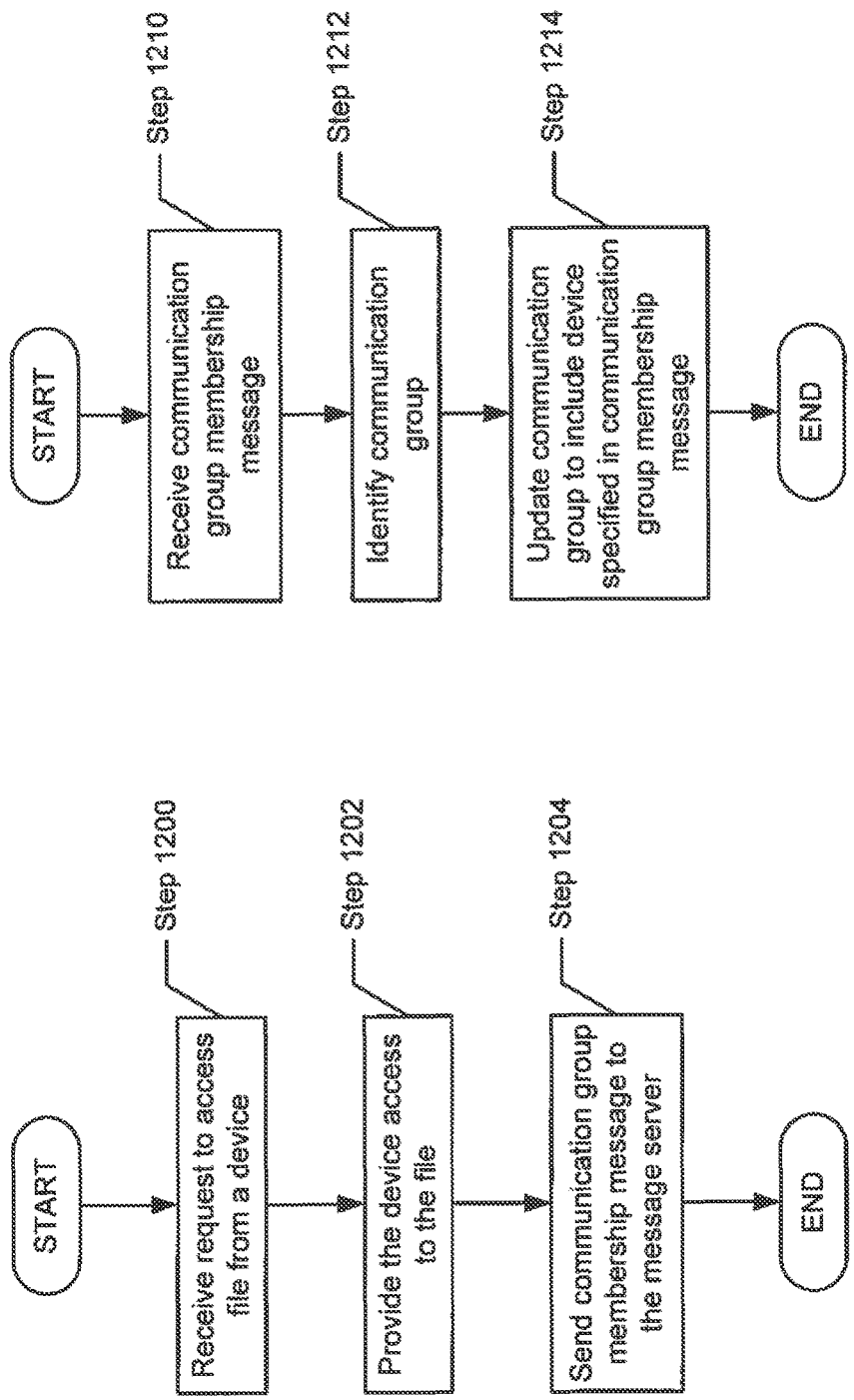

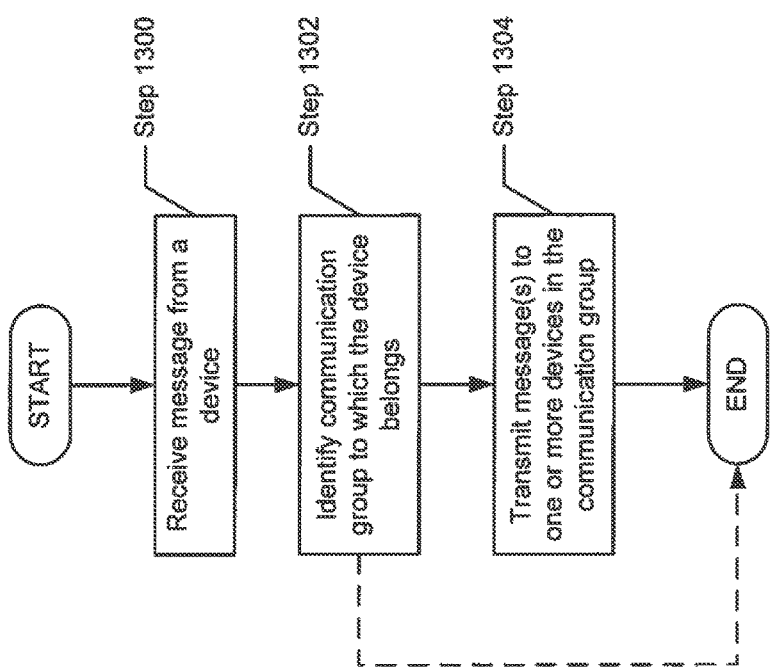

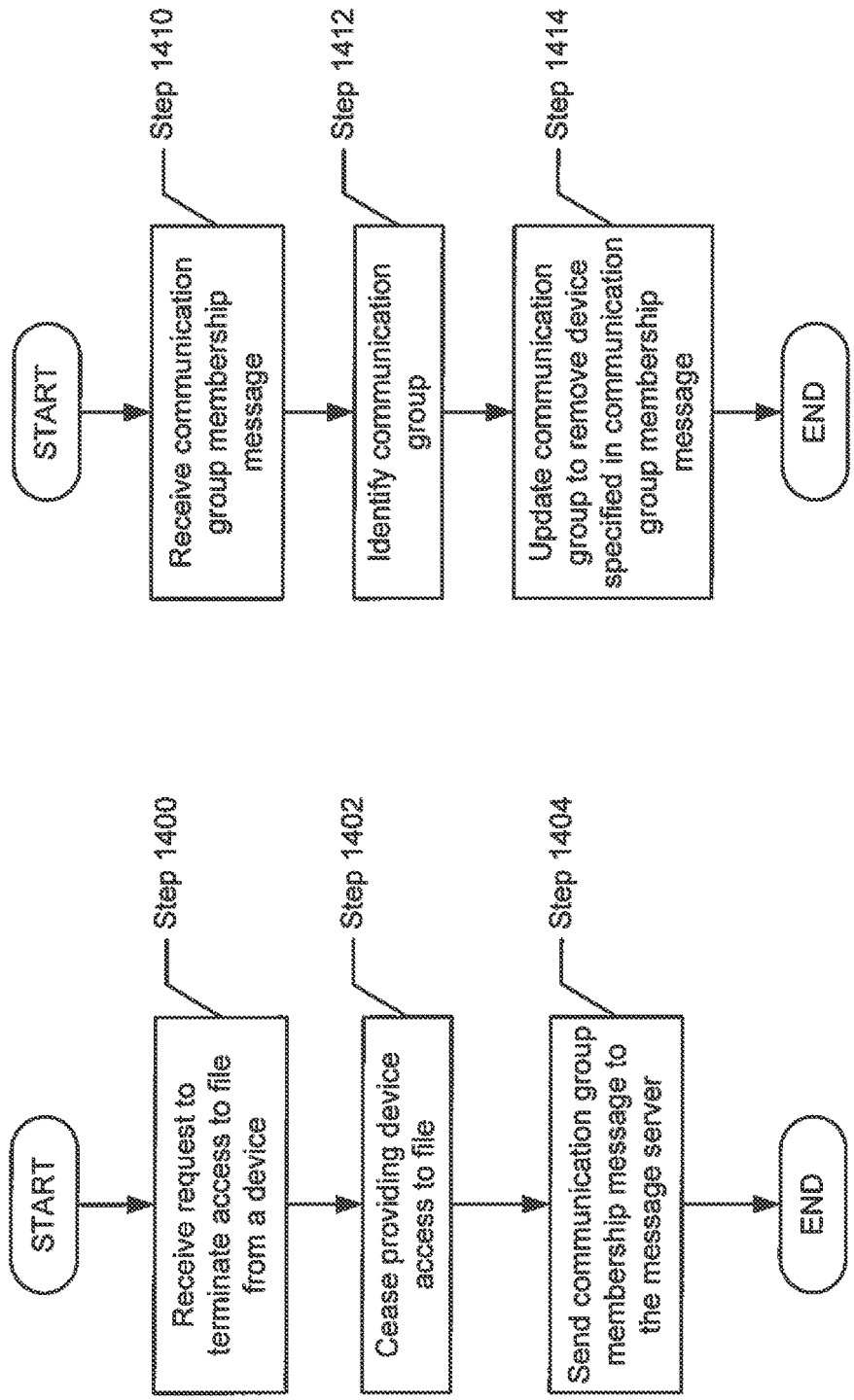

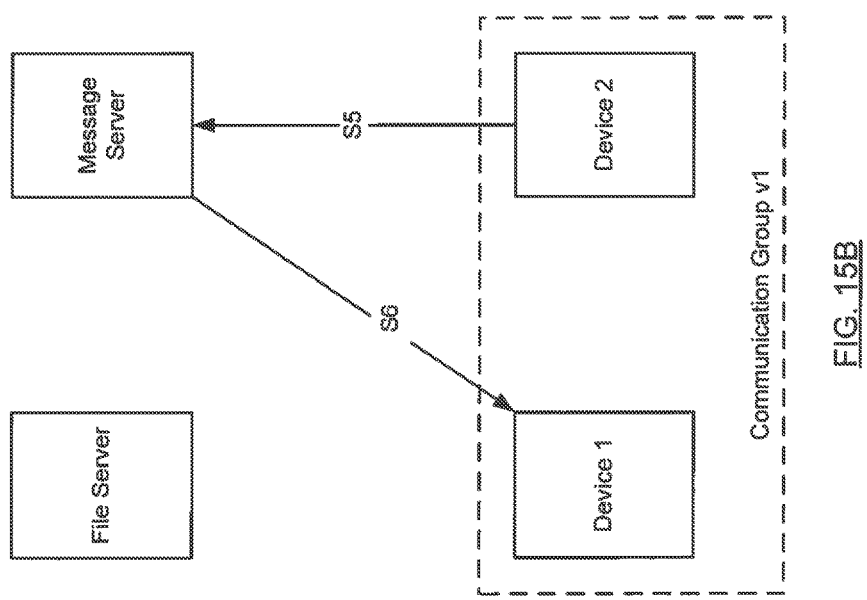

METHOD AND SYSTEM FOR DYNAMIC GROUP CREATION IN A COLLABORATION FRAMEWORK

CROSS REFERENCE TO RELATED APPLICATIONS

This application claims benefit under 35 U.S.C. § 119(e) to U.S. Provisional application No. 62/275,052, filed on Jan. 5, 2016, herein incorporated by reference in its entirety.

BACKGROUND

Many projects are team-based and often require the collaboration of multiple people, where the individuals on the team may or may not be using the same device to access content that is being shared as part of the collaboration.

SUMMARY

In general, in one aspect, the invention relates to a method for transmitting messages. The method includes determining that a first device and a second device are members of a communication group based on the first device and the second device concurrently accessing a file, receiving a message from the first device, making a first determination, in response to receiving the message, that the first device is a member of the communication group, and based on the first determination, making a second determination that the second device is a member of the communication group, and based on the second determination, transmitting a second message to the second device, wherein the second message is generated, based at least in part, on the message.

In general, in one aspect, the invention relates to a method for transmitting messages. The method includes dynamically creating a connection group, wherein each member the connection group is concurrently viewing a file, wherein each member of the connection group is a device, receiving a message from a first member of the connection group, and transmitting a copy of the message to at least one member of the connection group, wherein the at least one member of the connection group is not the first member.

In general, in one aspect, the invention relates to a method for transmitting messages. The method includes dynamically creating a connection group, wherein each member the connection group is concurrently executing an instance of an application, wherein each member of the connection group is a device, receiving a message from a first member of the connection group, and transmitting a copy of the message to at least one member of the connection group, wherein the at least one member of the connection group is not the first member.

In general, in one aspect, the invention relates to a system that includes a file server configured to: receive a request to access a file by a first device, provide the first device access to the file, and sending a communication group membership message to a messaging server. The system further includes a messaging server configured to: dynamically update a connection group to obtain an updated connection group using the communication group membership message, wherein the updated communication group comprises at least one other device concurrently accessing the file.

Other aspects of the invention will be apparent from the following description and the appended claims.

BRIEF DESCRIPTION OF DRAWINGS

FIG. 1B shows an apparatus in accordance with one or more embodiments of the invention.

FIGS. 2A-2C show hardware for operating an electronic flipchart in accordance with one or more embodiments of the invention.

FIGS. 3A-3C show hardware for operating an electronic flipchart in accordance with one or more embodiments of the invention.

FIG. 11 shows relationships between various components of the system in accordance with one or more embodiments of the invention.

FIGS. 12A-12B show a method for adding a device to the communication group in accordance with one or more embodiments of the invention.

FIG. 13 shows a method for distributing content to the communication group in accordance with one or more embodiments of the invention.

FIGS. 14A-14B show a method for removing a device from the communication group in accordance with one or more embodiments of the invention.

FIGS. 15A-15D show an example in accordance with one or more embodiments of the invention.

DETAILED DESCRIPTION

Figure 1A:
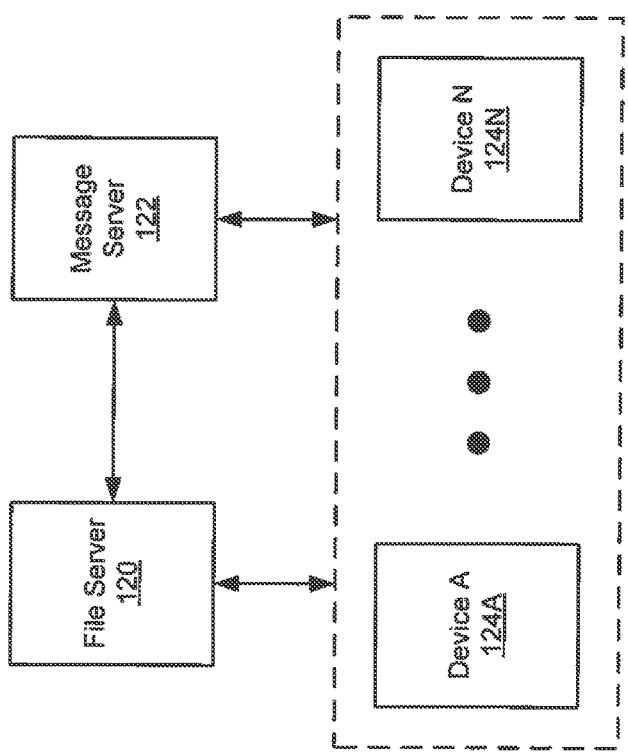
FIG. 1A shows a system in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-16, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention related to a method and system for dynamically creating and managing communication groups. In one embodiment of the invention, group membership is based on which file(s) a given device is currently accessing and/or which instance of an application the device is executing.

FIG. 1A shows a system in accordance with one or more embodiments of the invention. The system includes a file server (120), a message server (122), and one or more devices (124A, 124N). The aforementioned components may communicate with each other using any known or later discovered communication protocol. Further, the aforementioned components may communicate using any combination of wired and/or wireless connections and wired and/or wireless networks. Each of these components is described below;

In one embodiment of the invention, the file server (120) is implemented using one or more computing systems (see e.g., FIG. 16) and includes functionality to store one or more files (not shown), manage access to the one or more files, and service requests from one or more devices (124A, 124N) to read and/or modify one or more files. In addition, the file server (120) includes functionality to perform one or more of the steps shown in FIGS. 12A and 14A. For the purposes of this invention, the word "file" refers to any logically grouped data in a repository used for storing information. For instance, a file may correspond to a database entry, or group of database entries, a text document, an image, a multi-media document, or to any other collection of data that may be referenced using an identifier.

In one embodiment of the invention, the files stored and/or managed by the file server (120) may be stored in a repository (not shown). The repository includes persistent storage (e.g., solid state storage, magnetic storage, optical storage, any other type of persistent storage or any combination thereof) in which the files are stored. In one embodiment of the invention, the files include text, images, multi-media content (including, e.g., video), any other type of data or any combination thereof.

Continuing with the discussion of FIG. 1A, the message server (122) is implemented using one or more computing systems (see e.g., FIG. 16) and includes functionality to create and manage communication groups (described below, see e.g., FIG. 2). More specifically, the message server (122) includes functionality to perform one or more of the steps shown in FIGS. 12B and 14B. In addition, the message server (122) includes functionality to receive messages from one or more devices and transmit (or retransmit) the messages to other members of a corresponding communication group. (See e.g., FIG. 13).

In one embodiment of the invention, a message may include content that has been generated on one device that is to be subsequently displayed on another device. In another embodiment of the invention, the message includes a command that is to be executed on other devices in the communication group. The command, when executed on a device, may result in a change in the content that is being displayed on the device. The change in content may correspond to new content being displayed on the device (i.e., the content that was previously shown on the device is no longer displayed and different content is now displayed on the device). In another embodiment of the invention, the change in content may correspond to a modification (e.g., change in color, change in zoom level, etc.) of the current content on the device. In another embodiment of the invention, the change in content may correspond to new content that, when displayed on the device, is overlaid on at least a portion of the current content on the device (e.g., a text box may appear over a portion of the content currently displayed on the device, thereby obfuscating at least the portion of the content currently displayed on the device). Those skilled in the art will appreciate that commands are not limited to the aforementioned examples.

Continuing with the discussion of FIG. 1A, in one embodiment of the invention, the message server (122) includes functionality and, as necessary, data structures, to track: (i) which devices are part of which communication groups and (ii) the communication information for each of the devices which are part of any communication group. The communication information for a given device may include any information that is necessary for the message server (122) to transmit messages (see e.g., FIG. 13) to the device.

In one embodiment of the invention, the system includes one or more devices (124A, 124N). Each of the devices (124A, 124N) is implemented using one or more computing systems (see e.g., FIG. 16) and includes functionality to send read/access requests for files to the file server (120), display all or a portion of the file on a display (which is part of or operatively connected to the device) modify files and provide the modified files to the file server (120), generate and send messages to the message server (122), receive messages from the message server (122), and process messages received from the message server (122).

In one embodiment of the invention, one or more devices may include, but are not limited to, for example, e-flipchart apparatuses, smart phones, tablets, laptops, desktop computers, interactive white boards, gaming devices, or any other interactive computing device having a display area or screen for displaying content. In the description below, FIGS. 1B-10 describe one form of an interactive device, i.e., the e-flipchart apparatus, in accordance with embodiments of the invention.

While FIG. 1A shows a configuration of components, system configurations other than those shown in FIG. 1A may be used without departing from the scope of the invention. For example, various components (e.g., the file server and the message server) may be combined to create a single component. As another example, the functionality performed by a single component may be performed by two or more components.

Turning to the FIGS. 1B-10, one or more embodiments of the invention are directed to a method and apparatus for an electronic flipchart (herein after referred to as "e-flipchart"). The e-flipchart incorporates a reflective display. The e-flipchart described in embodiments herein may be implemented in a manner that is described as always "on" i.e., ready to use, and includes capability to keep a record of what is drawn or written on the e-flipchart. In one or more embodiments of the invention, the e-flipchart is configured to accept multiple forms of input, e.g., touch input, digital marker input, network input, etc. (see e.g., FIG. 6).

FIG. 1B shows a schematic diagram of an apparatus of an e-flipchart (also referred to as an e-flipchart apparatus) in accordance with one or more embodiments of the invention. While FIG. 1B shows a configuration of components, other configurations may be used without departing from the scope of the invention. For example, various components may be combined to create a single component. As another example, the functionality performed by a single component may be performed by two or more components.

Turning to FIG. 1B, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106). In one embodiment of the invention, the reflective display (106) may be viewed as an output device that, through reflection, harnesses ambient light in order to present content. For example, the reflective display (106) may host slow refresh rates, monochromatic coloring (e.g., black and white, or gray scale shading), and the presentation of low contrasting definition. However, on the other hand, the reflective display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to a reflective display (106) for presentation. Examples of a reflective display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above referenced patent.

Continuing with the discussion of FIG. 1B, in front of the reflective display (106) is a layer having at least one touch portion which may be a transparent rigid or semi-rigid board (104), or a frame that uses edge sensors, such as Infra-red or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the reflective display (106) is an optional electromagnetic layer, which may be an electromagnetic board (110). By combining the electromagnetic layer (110) and the layer having at least one touch portion (104), at least a dual system for touch input is obtained. In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allows the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the reflective display, while touching the same area with a finger may pan or zoom the display area.

Continuing with FIG. 1B, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8. Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1B is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1B, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1B is approximately 42 inches in diagonal with a 3:4 aspect ratio. Those skilled in the art will appreciate that the size of the e-flipchart apparatus is designed to mimic that of a typical paper flipchart; however, the dimensions and size of the reflective display apparatus of FIG. 1B may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1B describes an e-flipchart with a series of components organized in particular manner, those skilled in the art will appreciate that the location of such various components in the e-flipchart, in particular, the reflective display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1B above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the reflective display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

Figure 4:
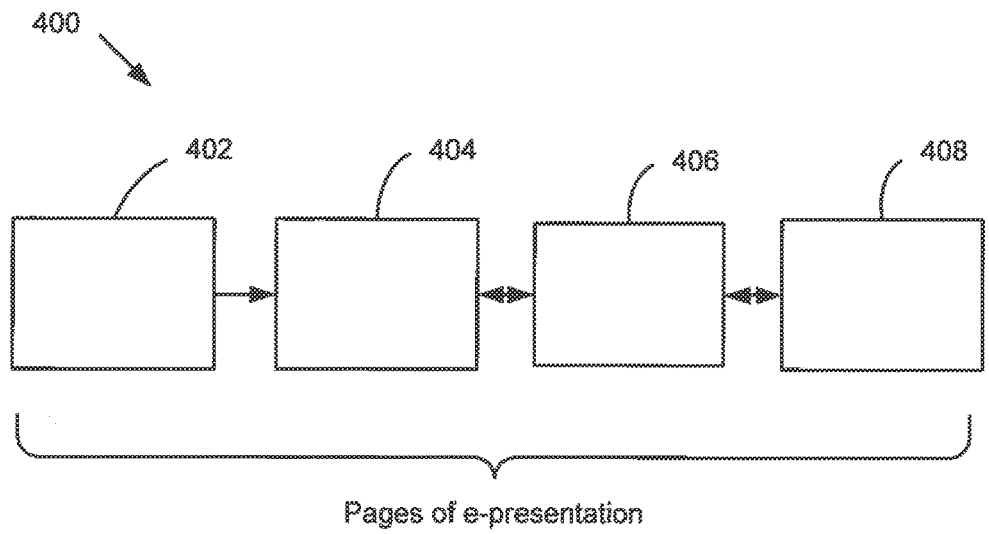
FIG. 4 shows a data structure for an electronic flipchart in accordance with one or more embodiments of the invention.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof. For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
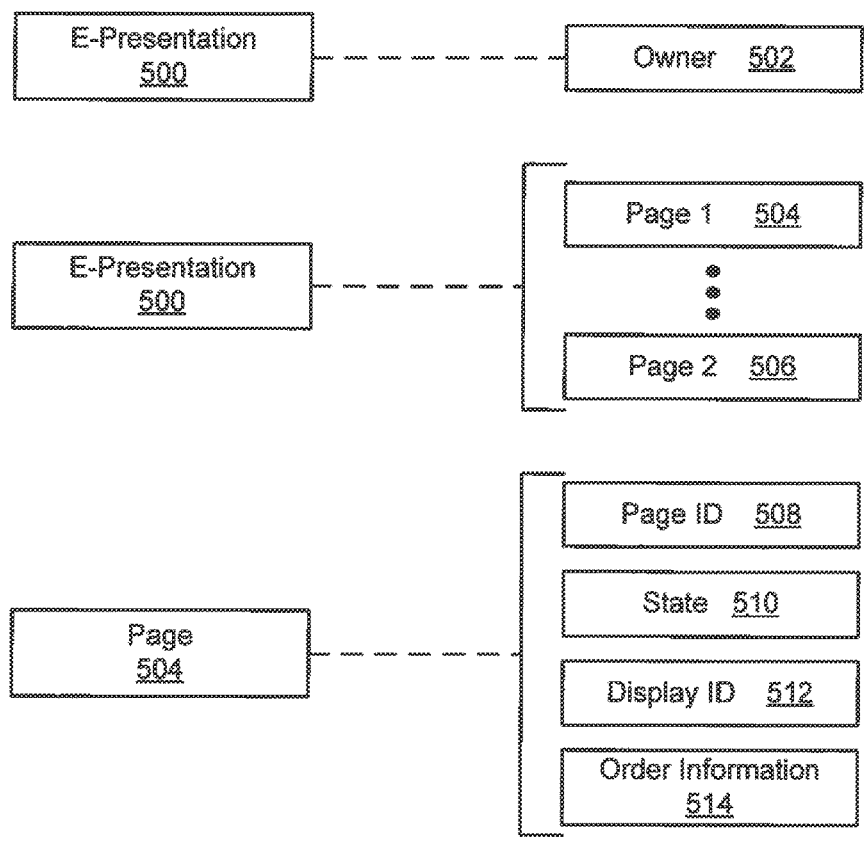
FIG. 5 shows data relationships for an electronic flipchart in accordance with one or more embodiments of the invention.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device identifier (ID) which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

Figure 6:
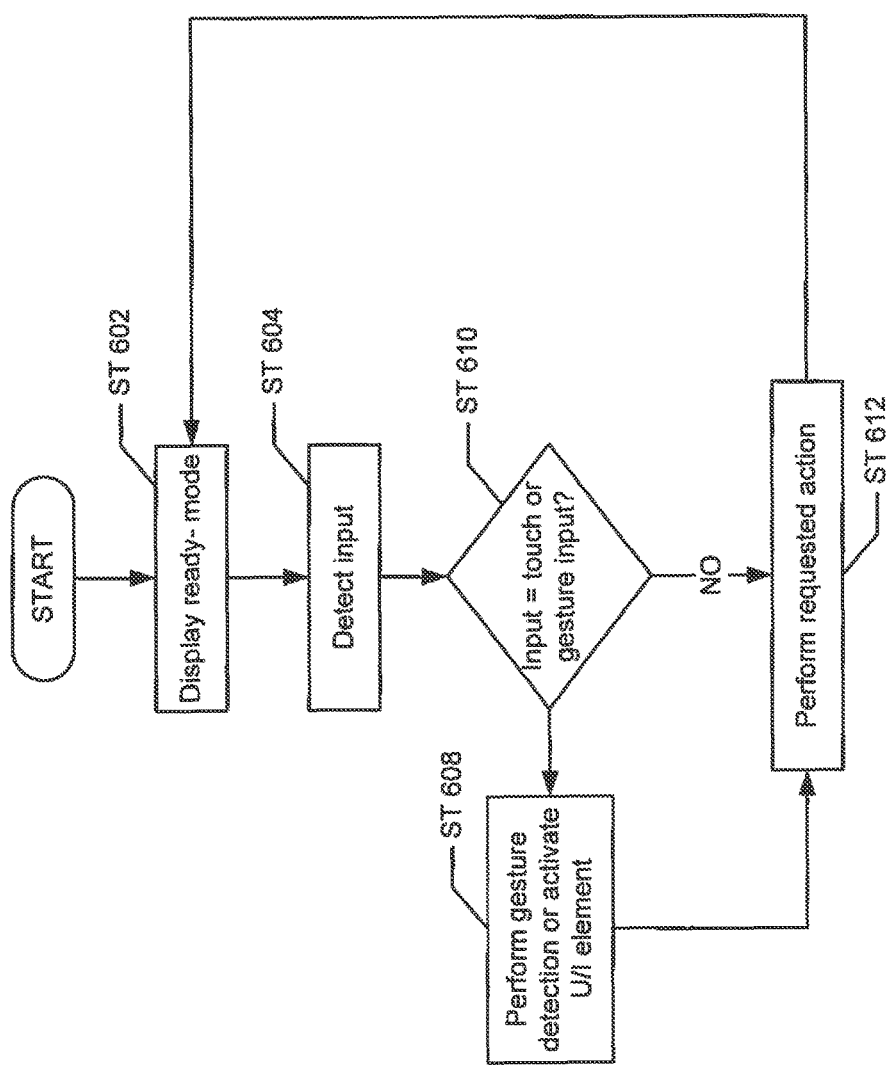
FIG. 6 shows a flowchart in accordance with one or more embodiments of the invention.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus to continue to display an image without any power used by the bi-stable reflective display component of the apparatus. Examples of the types of actions that may be performed are described below in FIGS. 7A-7E.

Figure 7C:
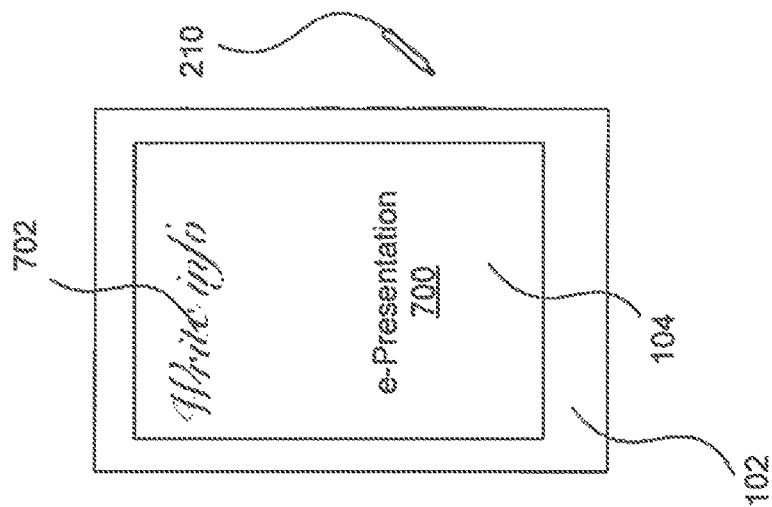
FIGS. 7A-7F show examples of an electronic flipchart in accordance with one or more embodiments of the invention.
Figure 7B:
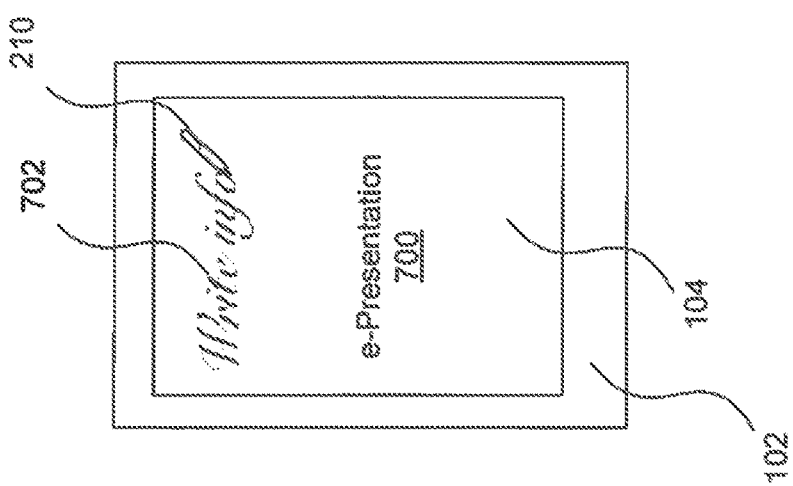
Figure 7A:
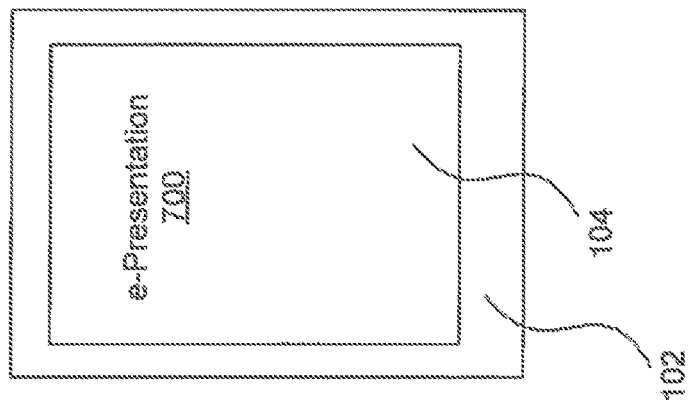

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the reflective display component of the e-flipchart apparatus. In one or more embodiments of the invention, the reflective display displays the latest information that resulted from input to the e-flipchart, and does not change until new input is received by the controller.

Figure 7E:
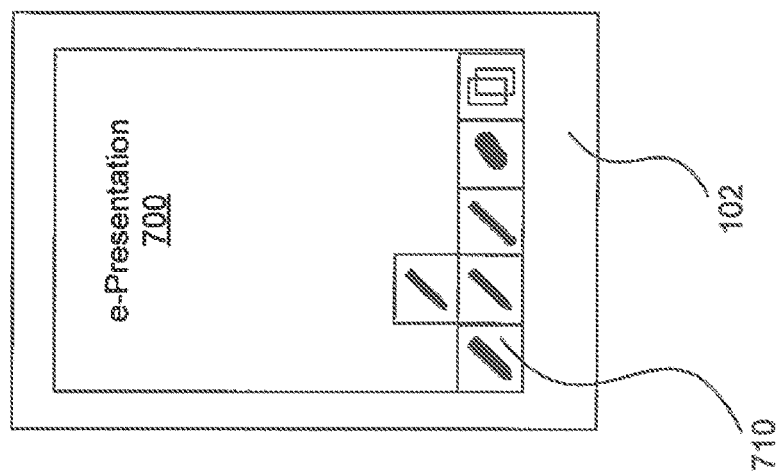
Figure 7D:
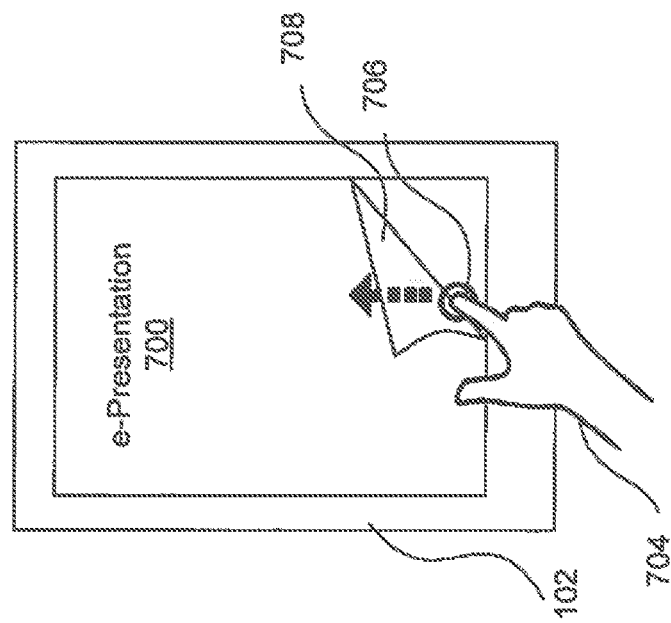

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel. In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
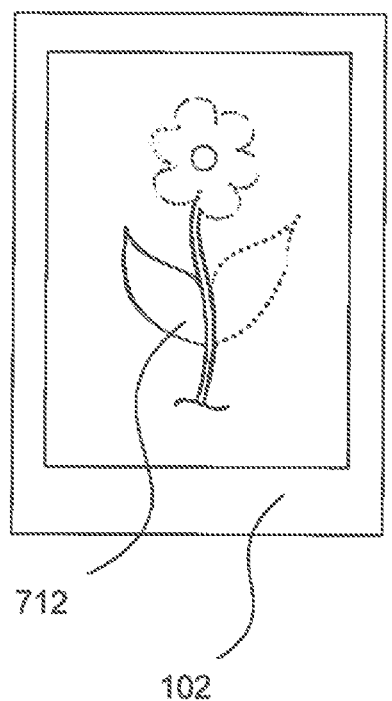

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
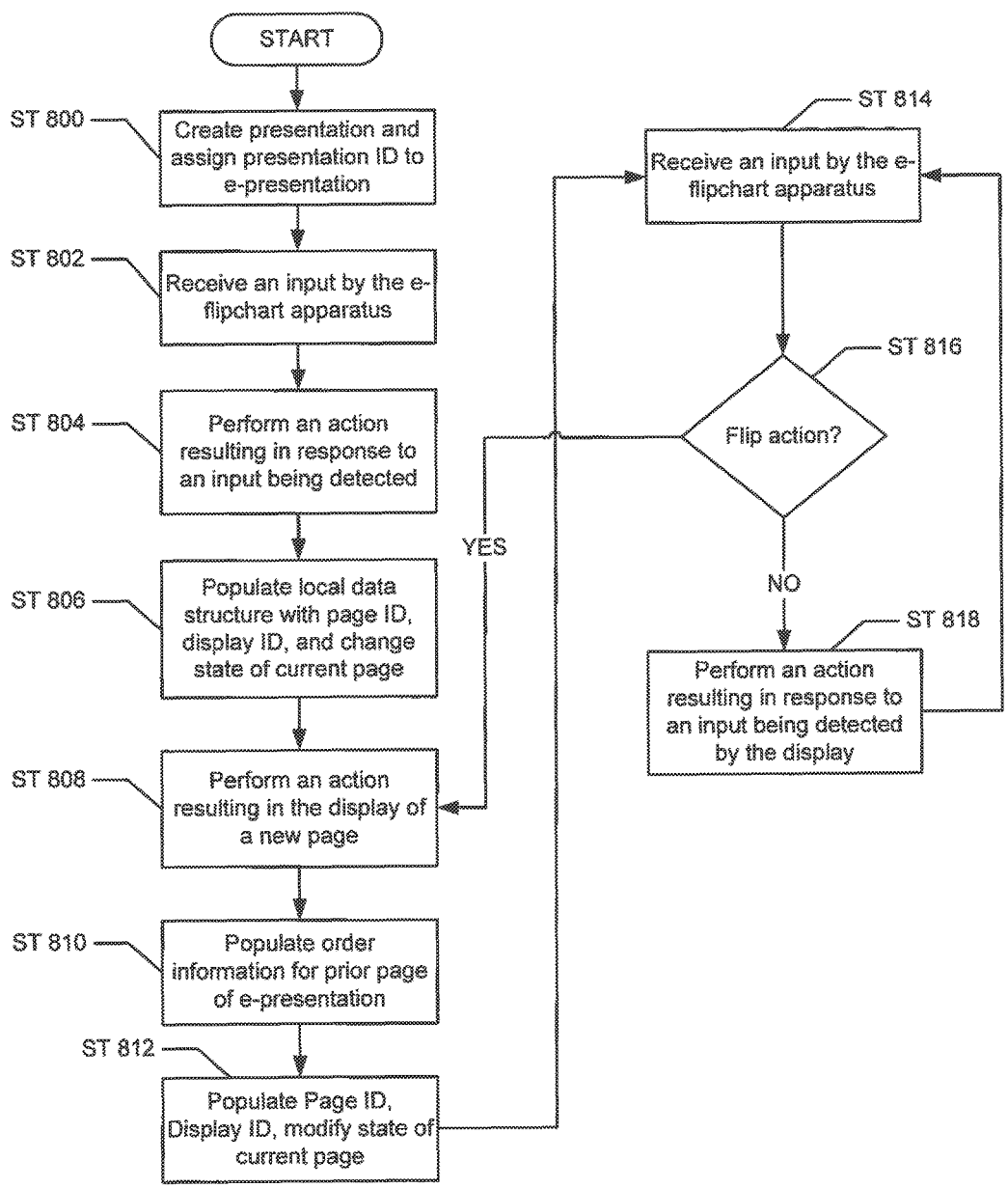
FIG. 8 shows a flowchart in accordance with one or more embodiments of the invention.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the reflective display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. In step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figures 9A, 9B:
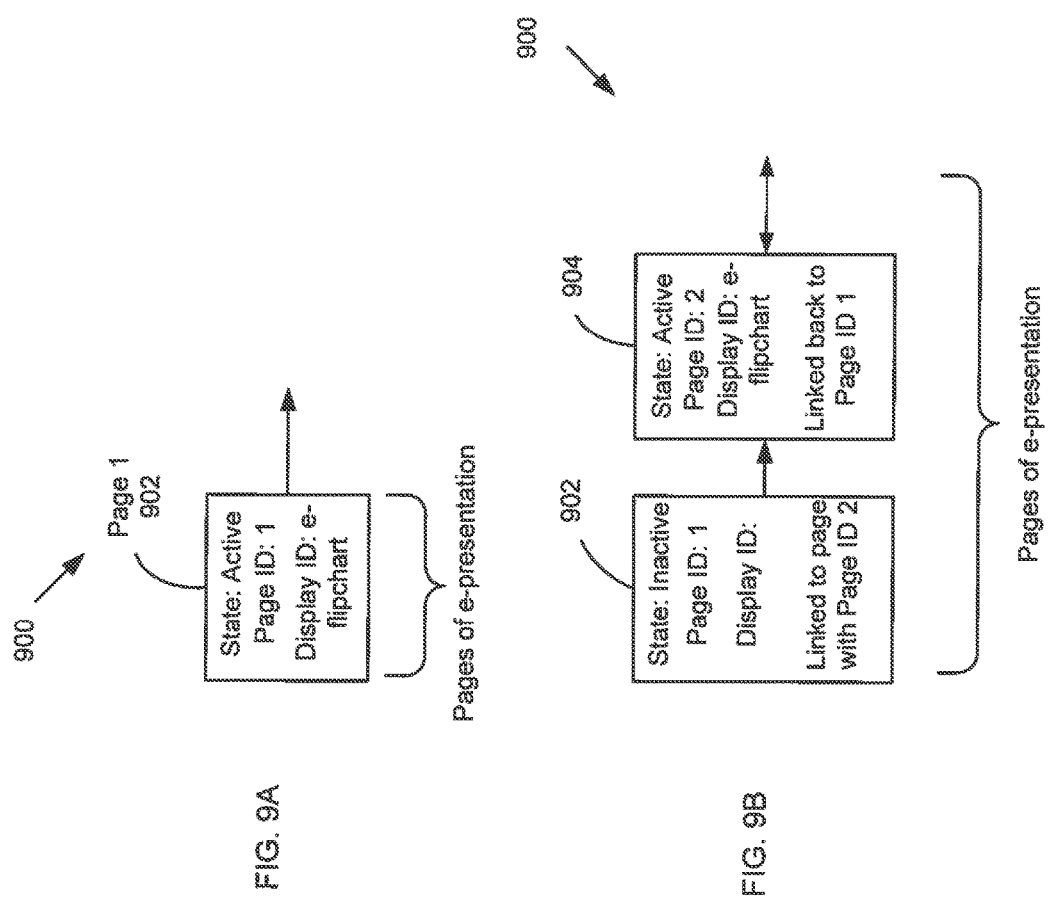
FIGS. 9A-9C show examples of storing data for an electronic flipchart in accordance with one or more embodiments of the invention.

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Figure 9C:
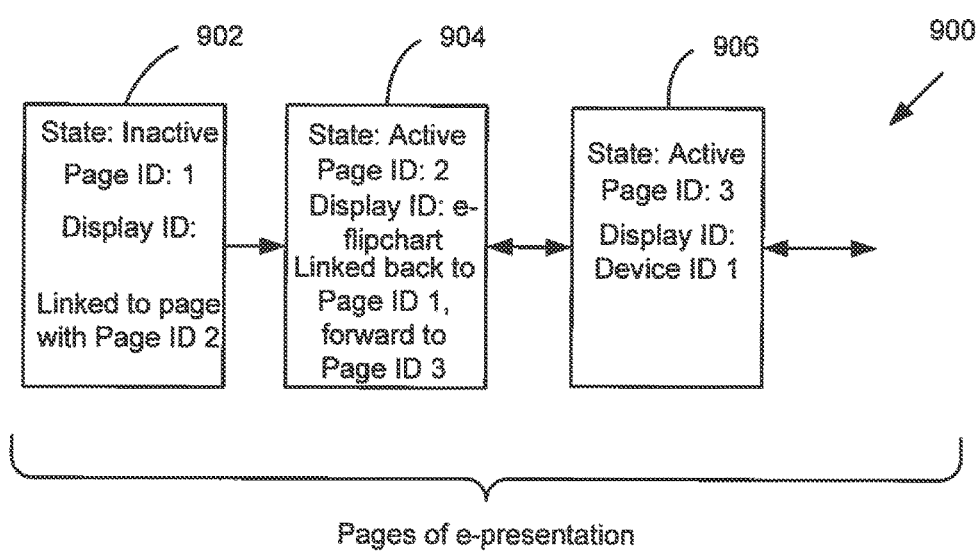

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/ interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

Figure 10:
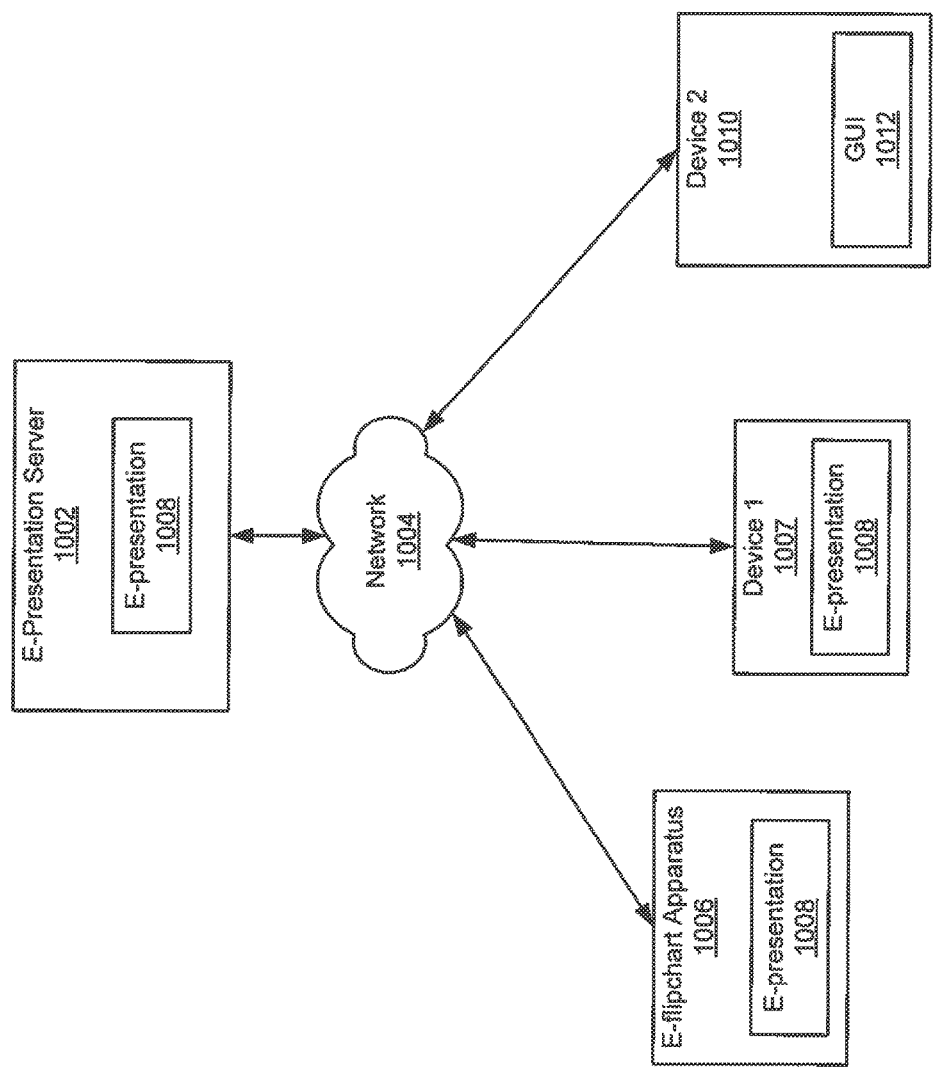
FIG. 10 shows a system for collaboration using an electronic flipchart in accordance with one or more embodiments of the invention. [ . . . ]

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as a an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the reflective display. E-presentations created using the e-flipchart apparatus may be stored, copied, shared, revised, transferred, and managed using the information described above. Moreover, because the e-flipchart apparatus uses a reflective display, it mimics the look and feel of traditional paper flipcharts.

FIG. 11 shows relationships between various components of the system in accordance with one or more embodiments of the invention. As discussed above, the message server (FIG. 1A, 1011) includes functionality to dynamically create and manage communication groups. In one embodiment of the invention, a communication group (1104) includes, as members, one or more devices (1100A, 1100B), where each of the devices is currently accessing a common file (1102) (or set of files).

In one embodiment of the invention, a communication group (1110) includes, as members, one or more devices (1106C, 1106D), where each of the devices is currently executing an instance of a common application (1108C, 1108D) (or instances of a common set of applications). For example, all devices executing their own instance of a common calendar application may be members of a communication group.

In one embodiment of the invention, the message server includes functionality to concurrently manage any number of communication groups. Further, each device may be concurrently associated with one or more communication groups. In addition, the membership for each communication group managed by the message server may be determined based on: (i) current access to a common file (1102), (ii) current execution of an instance of a common application, or (iii) any combination of (i) and (ii).

In one embodiment of the invention, other factors may be used to determine membership of a communication group. For example, the membership of a communication group may be based on execution of an instance of a common application along with another factor such as geographic location, a user attribute (e.g., all users in the same company), accessing a specific piece of content via the instance of the common application, or any other factor. Those skilled in the art will appreciate that the above examples are not intended to limit the scope of the invention.

In one embodiment of the invention, each communication group may be associated with a communication group identifier, which uniquely identifies the communication group. Further, the membership of each communication group may be managed using one or more data structures, where the data structure(s) map: (i) a communication group identifier to an identifier(s) of one or more files and (ii) the communication identifier to one or more identifiers associated with the devices that are members of the communication group. In one embodiment of the invention, the mapping in (i) may be modified to include any criterion (criteria) that is used to create the communication group. For example, as discussed above, the communication group may be determined based on a set of devices all executing an instance of a common application. In this example, the mapping under (i) may include an identifier associated with the common application and may not include an identifier of one or more files.

FIGS. 12A-14B show flowcharts in accordance with one or more embodiments of the invention. While the various steps in each flowchart are presented and described sequentially, one of ordinary skill in the art will appreciate that some or all of the steps may be executed in different orders, may be combined or omitted, and/or may be executed in parallel. In one embodiment of the invention, one or more steps shown in FIGS. 12A-14B may be performed in parallel with one or more other steps shown in FIGS. 12A-14B.

FIGS. 12A-12B show a method for adding a device to the communication group in accordance with one or more embodiments of the invention. In one embodiment of the invention, the method shown in FIGS. 12A-12B may be used to create a new communication group and/or add new devices to an existing communication group.

Turning to FIG. 12A, in step 1200, a request to access a file is received from a device (see e.g., FIG. 1A) by the file server. The request may include, for example, an identifier of the file (also referred to as a file ID) (such as a file name) and, optionally, user credentials (e.g., user name and password) and/or credentials (e.g., device ID, media access control address, etc.) associated with the device. The request may include different and/or other information without departing from the invention.

In step 1202, a determination is made about whether the device (or current user of the device) may access the file. This determination may be made, for example, using credentials provided in the request and/or credentials that are subsequently obtained from the device (or from the current user of the device). If the file server determines that the device (or the current user of the device) may access the file, the file is retrieved by the file server and then transmitted to the device. In another embodiment of the invention, the file server always permits the device (or current user of the device) to access the file and, as such, does not make any determinations using any credentials about whether the device (or current user of the device) is permitted to access the file.

In step 1204, the file server generates a communication group membership message (CGMM) and transmits the CGMM to the message server. In one embodiment of the invention, the CGMM includes a request to add a device to a communication group, an identifier of the file (e.g., the identifier in the request or another identifier that uniquely identifies the file, where such an identifier is not known to the devices) and communication information for the device (i.e., the device that issued the request in step 1200). In another embodiment of the invention, the CGMM includes a unique identifier of the device (i.e., the device that issued the request in step 1200) but does not include all of the communication information. In such embodiments, the message server may use the unique identifier of the device to obtain communication information for the device, where the communication information may be obtained from another computing system and/or data repository.

Turning to FIG. 12B, in step 1210, the message server receives the CGMM from the file server.

In step 1212, upon receipt of the CGMM, the message server extracts the identifier associated with the file from the CGMM. The identifier is subsequently used to determine whether to: (i) create a new communication group or (ii) add the device to an existing communication group. If a communication group is associated with the file (identified by the identifier included in the CGMM), then the process proceeds to step 1214. Alternatively, if no communication group associated with the file (identified by the identifier included in the CGMM) exists, then a new communication group associated with the file is created. Creating the new communication group may include, for example, creating an entry in a data structure maintained by the message server, which maps the identifier associated with the file (extracted) from the CGMM and an identifier associated with the device (which may be extracted from the communication information in the CGMM or be obtained directly from the CGMM (in scenarios in which the CGMM includes an identifier associated with the device but not communication information)). Once the new communication group is created, the process ends.

In step 1214, if there is an existing communication group (as determined in step 1212), then the device is added to the communication group resulting in an updated communication group. Updating the communication group may include updating a data structure in the message server to add an identifier of the device to an entry associated with the communication group.

FIG. 13 shows a method for distributing content to the communication group in accordance with one or more embodiments of the invention.

Turning to FIG. 13, in step 1300, a message (as described above) is received from a device by the message server. In one embodiment of the invention, the message may also include distribution criterion (or criteria). The distribution criterion (or criteria) may be used to determine to which members of the communication group the message is to be transmitted. In this manner, the message may be used to provide additional granularity about which devices should be receiving the message. For example, the distribution criterion specifies that only members in a specific geographic regions should receive the message. For another example, the distribution criteria may specify precisely which devices and/or users associated with the devices should be receiving the message. The invention is not limited to the aforementioned examples.

In step 1302, the message server uses information associated with the device (e.g., an identifier associated with the device, which may be extracted from the message) to determine whether the device is a member of a communication group. The above determination may be performed, for example, by performing a look-up in one or more data structures maintained by the message server to determine whether there are any communication groups of which the device is a member. The result of step 1302 may be the identification of zero, one or more communication groups. If no communication groups are identified, the process ends. However, if one or more communication groups are identified, then the process proceeds to step 1304.

If the message includes distribution criteria, then step 1302 may also include applying the distribution criteria to determine to which members of a communication group the message should be transmitted. For example, consider a scenario in which devices 1-5 are members of a communication group 1, where devices 1-3 are located in the geographic location 1 and devices 4-5 are located in geographic location 2. Further, assume that device 1 sends a message to the message server that includes distribution criteria which specifies that only devices within the communication group that are in geographic location 2 should receive the message. In this example, the message server may first determine to which communication group device 1 belongs (i.e., communication group 1) and then apply the distribution criteria to the communication group to identify which members in the communication group satisfy the distribution criteria. In this example, only devices 4-5 satisfy the distribution criteria. Accordingly, the message is only sent to devices 4-5 in step 1304.

In another embodiment of the invention, each member in a communication group includes information about the other members in the communication group (e.g., a device ID, or another identifier). Further, as the membership in a communication changes, the remaining members are updated as to the current membership of the communication group. In such embodiments, a member of the communication group may issue a message to specific members in the communication group. This may be achieved, for example, by including device IDs (or other identifiers) as distribution criteria in the message. In such scenarios, step 1302 may include extracting the device IDs (or other identifiers) from the message and then using this information in step 1304.

The following is an example of the aforementioned embodiment. Consider a scenario in which devices 1-5 are members of a communication group 1. Further, assume that device 1 sends a message to the message server that includes distribution criteria which specifies that only devices 3 and 5 within the communication group should receive the message. In this example, the message server extracts the distribution criteria from the message (i.e., device identifiers for device 3 and 5) and uses this information to only send the message to devices 3 and 5 in step 1304.

In step 1304, for each communication group identified in step 1302, the following process may be performed: (i) identify each member of the communication group; (ii) for each member of the communication group (excluding the device that issued the request in step 1300), generate a message, where the message includes the content of the message received in step 1300 or content derived from the message received in step 1300 (the message generated in step 1300 may include other content that was not present in the message received in step 1300); and (iii) transmit a message (as generated in (ii)) to each of the members (excluding the device that issued the request in step 1300) using all (or a portion) of the communication information for the devices. If performing step 1302 resulted in only a subset of members in a communication group being identified as targets of the message, then in step 1304, for each identified member: (i) generate a message, where the message includes the content of the message received in step 1300 or content derived from the message received in step 1300 (the message generated in step 1300 may include other content that was not present in the message received in step 1300) and (ii) transmit a message (as generated in (i)) to each of the identified members (excluding the device that issued the request in step 1300) using all (or a portion) of the communication information for the devices.

FIGS. 14A-14B show a method for removing a device from the communication group in accordance with one or more embodiments of the invention.

Turning to FIG. 14A, in step 1400, a request to terminate access to a file is received from a device. The request may be triggered based on user action (e.g., closing a file on the device), automatically by the device (e.g., when there is loss of network connectivity between the device and the file server), by a user of another device, and/or in response to some condition being met which results in the termination being triggered by software on a device or server. In another embodiment of the invention, if access of the file by the device is no longer permitted (e.g., due to a change in access permissions), then access to the file may also be terminated without a such a request being issued by a device.

In step 1402, the file server ceases providing the device access to the file.

In step 1404, the file server generates a communication group membership message (CGMM) and transmits the CGMM to the message server. In one embodiment of the invention, the CGMM includes a request to remove a device from a communication group, an identifier of the file (e.g., the identifier in the request or another identifier that uniquely identifies the file, where such an identifier is not known to the devices) and communication information for the device (i.e., the device that issued the request in step 1400). In another embodiment of the invention, the CGMM includes a unique identifier of the device (i.e., the device that issued the request in step 1400) but does not include the all of the communication information.

Turning to FIG. 14B, in step 1410, the message server receives the CGMM from the file server (i.e., the CGMM transmitted in step 1404).

In step 1412, upon receipt of the CGMM, the message server extracts the identifier associated with the file from the CGMM. The identifier is subsequently used to identify the communication group of which the device is a member. The identification of the communication group using the identifier may be performed in a manner that is substantially similar step 1212.

In step 1414, if there is an existing communication group (as determined in step 1412), then the device is removed from the communication group resulting in an updated communication group. Updating the communication group may include updating a data structure in the message server to remove an identifier of the device from an entry associated with the communication group.

While FIGS. 12A-14B describe a creation and management of communication groups based on access to a common file, embodiments of the invention may be extended to create and manage communication groups using other criteria (as discussed above). In such scenarios, the system may include one or more other server (i.e., servers other than the file server) that track whether a given device meets the criteria to join and/or be removed from a group and then generate the appropriate CGMMs (described above) with information that may be used by the message server to add and/or remove a given device from a communication group.

FIGS. 15A-15D show an example in accordance with one or more embodiments of the invention. The example of FIGS. 15A-15D is for explanatory purposes only, and is not intended to limit the scope of the invention.

Figure 15A:
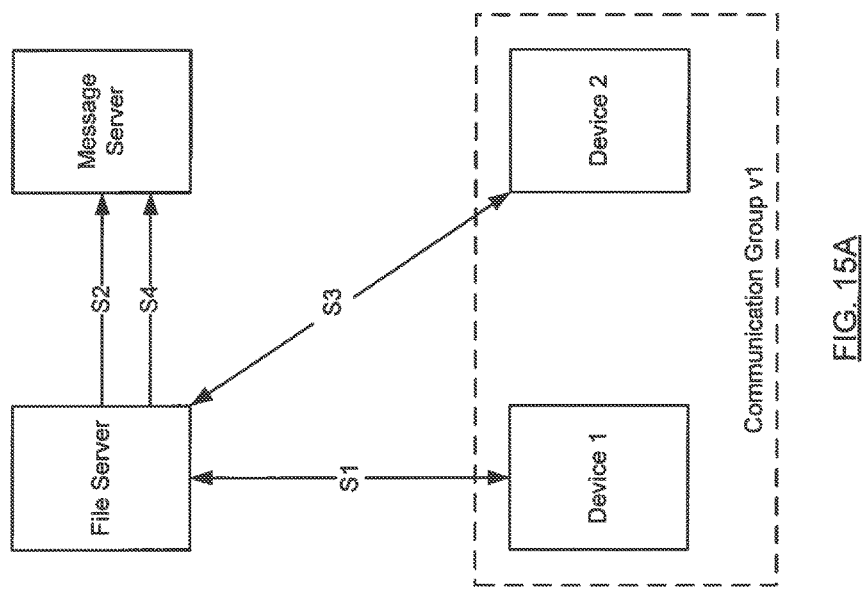

Turning to FIG. 15A, consider a scenario in which Device 1 issues a request to the file server to access file "foo" and the file server subsequently provides access to file "foo" to Device 1 (step S1). The file server then generates and issues a CGMM to the message server (step S2). The message server, upon receipt of the CGMM, creates a communication group with communication group ID—"1" for devices accessing file "foo" and adds Device 1 to the communication group. Subsequently, Device 2 issues a request to the file server to access file "foo" and, in response, the file server provides access to file "foo" to Device 2 (step S3). The file server then generates and issues a CGMM to the message server (step S4). The message server subsequently determines that a communication group exists for file "foo" and adds Device 2 to the communication group with communication group ID—"1".

Referring to FIG. 15B, Device 2 generates a message and sends the message to the message server (Step S5). In one embodiment of the invention, Device 2 does not need to know which devices are part of the communication group and does not need to know how to communicate with other such devices. Rather, the user of Device 2 only has to generate a message that he or she wishes to be transmitted to all other devices that are also currently accessing file "foo."

The message server determines that the communication group with communication group ID—"1" is associated with file "foo" and that Device 1 is a member of the communication group. Accordingly, the message server generates and sends a message (based on the message provided by Device 2) to the Device 1 (Step S6).

Figure 15C:
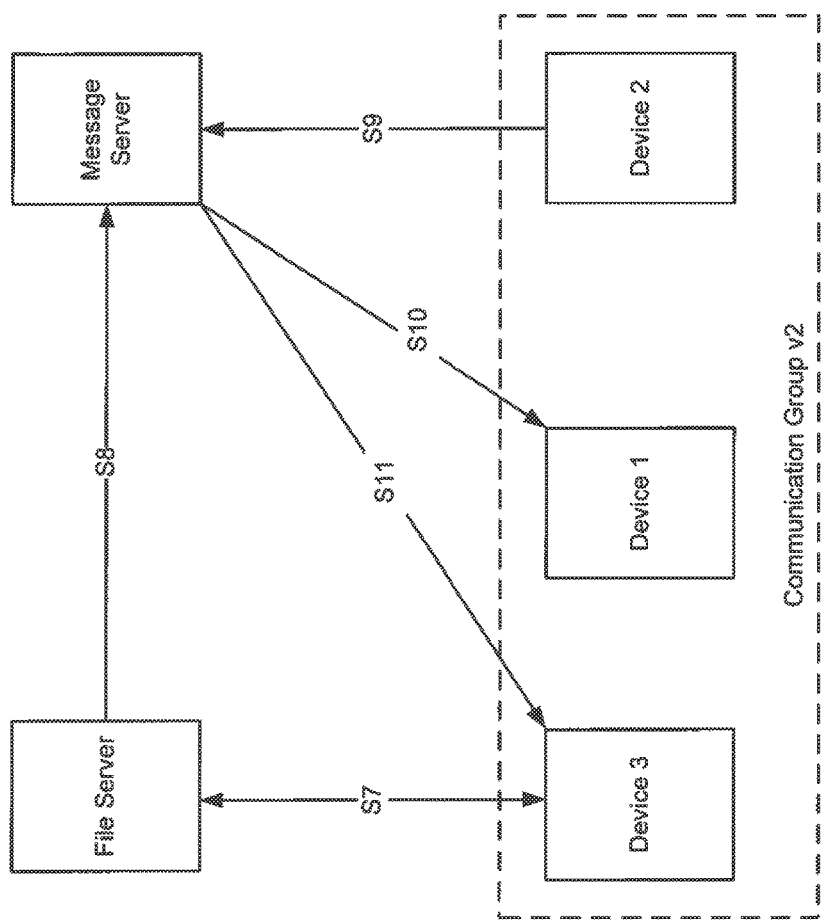

Referring to FIG. 15C, Device 3 issues a request to the file server to access file "foo" and the file server subsequently provides access to file "foo" to Device 3 (step S7). The file server then generates and issues a CGMM to the message server (step S8). The message server subsequently determines that a communication group exists for file "foo" and adds Device 3 to the communication group with communication group ID—"1".

Device 2 then generates a message and sends the message to the message server (Step S9). In one embodiment of the invention, Device 2 does not need to know which devices are part of the communication group and does not need to know how to communicate with other such devices. Rather, the user of Device 2 only has to generate a message that he or she wishes to have transmitted to all other devices that are also currently accessing file "foo."

The message server determines that the communication group with communication group ID—"1" is associated with file "foo" and that Device 1 and Device 3 are members of the communication group. Accordingly, the message server generates and sends a message (based the messaged provided by Device 2) to the Device 1 and Device 3. (Steps 10 and 11).

Figure 15D:
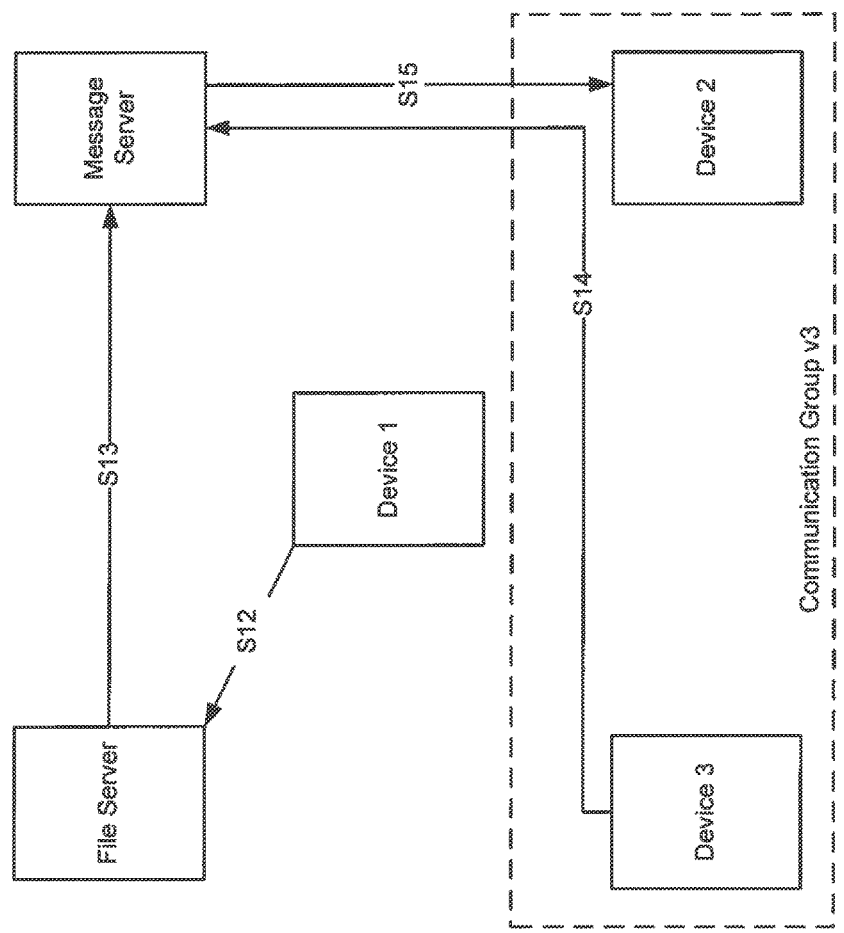

Referring to FIG. 15D, Device 1 sends a request to terminate access to file "foo." (Step S12). The file server terminates access to file "foo" for Device 1 and then generates and issues a CGMM to the message server (step S13). The message server subsequently determines that a communication group exists for file "foo" and removes Device 1 from the communication group with communication group ID—"1".

Device 3 then generates a message and sends the message to the message server (Step S14). In one embodiment of the invention, Device 3 does not need to know which devices are part of the communication group and does not need to know how to communicate with other such devices. Rather, the user of Device 3 only has to generate a message that she wishes to transmit to all other devices that are also currently accessing file "foo."

The message server determines that the communication group with communication group ID—"1" is associated with file "foo" and that Device 2 is a member of the communication group. Accordingly, the message server generates and sends a message (based on the message provided by Device 3) to the Device 2 (Step 15).

Figure 16:
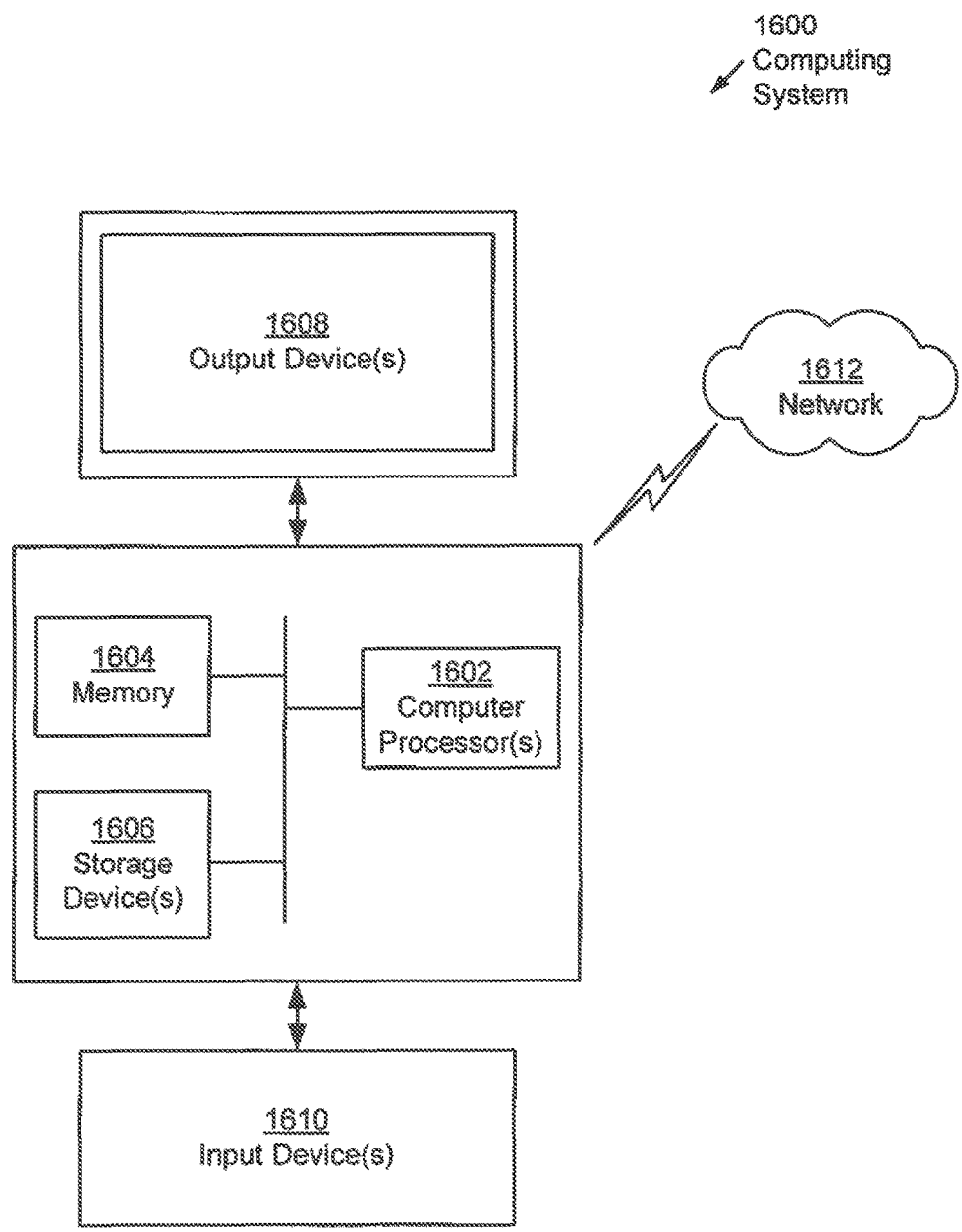
FIG. 16 shows a computing device in accordance with one or more embodiments of the invention.

Embodiments of the technology may be implemented on a computing system. Any combination of mobile, desktop, server, embedded, or other types of hardware may be used to implement the computing system. For example, as shown in FIG. 16, the computing system (1600) may include one or more computer processors (1602), associated memory (1604) (e.g., random access memory (RAM), cache memory, flash memory, etc.), one or more storage devices (1606) (e.g., a hard disk, an optical drive such as a compact disk (CD) drive or digital versatile disk (DVD) drive, a flash memory stick, etc.), and numerous other elements and functionalities. The computer processor(s) (1602) may be an integrated circuit for processing instructions. For example, the computer processor(s) may be one or more cores, or micro-cores of a processor. The computing system (1600) may also include one or more input devices (1610), such as a touchscreen, keyboard, mouse, microphone, touchpad, electronic pen, or any other type of input device. Further, the computing system (1600) may include one or more output device(s) (1608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1600) may be connected to a network (1612) (e.g., a local area network (LAN), a wide area network (WAN) such as the Internet, mobile network, or any other type of network) via a network interface connection (not shown). The input and output device(s) may be locally or remotely (e.g., via the network (1612)) connected to the computer processor(s) (1602), memory (1604), and storage device(s) (1606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting messages, comprising:
   receiving, by a file server, a request to access a file by a first device;
   providing the first device access to the file;
   sending, from the file server, a communication group membership message (CGMM) to a messaging server, wherein the CGMM comprises a first device ID associated with first device and a file ID associated with the file;
   dynamically updating, by the messaging server, a communication group to obtain an updated communication group using the CGMM, wherein the updated communication group comprises a second device concurrently accessing the file;
   receiving, by the messaging server, a message from the first device;
   making a first determination, in response to receiving the message, that the first device is a member of the updated communication group; and
   based on the first determination, making a second determination that the second device is a member of the updated communication group; and
   based on the second determination, transmitting, by the messaging server, a second message to the second device, wherein the second message is generated, based at least in part, on the message.

2. The method of claim 1, further comprising:
   adding a third device to the communication group, after the third device accesses the file, to obtain a second updated communication group;
   receiving a third message from the second device;
   making a third determination, in response to receiving the third message, that the second device is a member of the second updated communication group; and
   based on the third determination, making a fourth determination that the first device is a member of the second updated communication group;
   based on the fourth determination, transmitting a fourth message to the first device, wherein the fourth message is generated, based at least in part, on the third message;

making a fifth determination that the third device is a member of the second updated communication group; and based on the fifth determination, transmitting a fifth message to the third device, wherein the fifth message is generated, based at least in part, on the third message.

3. The method of claim 2, further comprising:

removing the first device from the second updated communication group after the first device ceases accessing the file to obtain a third updated communication group;

receiving a sixth message from the second device;

making a sixth determination, in response to receiving the sixth message, that the second device is a member of the second updated communication group;

based on the sixth determination, making a seventh determination that the third device is a member of the third updated communication group; and based on the sixth determination, transmitting a seventh message to the third device, wherein the seventh message is generated, based at least in part, on the sixth message.

4. The method of claim 1, further comprising:

prior to the first determination:

updating a communication group data structure associated with the communication group to include the first device ID associated with the first device, wherein the updated communication group data structure comprises a device ID for each member of the updated communication group.

5. The method of claim 1, wherein the first device is an e-flipchart apparatus.

6. The method of claim 1, wherein the message comprises a command to be performed by all devices that are members of the communication group.

7. The method of claim 1, wherein the message specifies a distribution criterion, wherein the distribution criterion is used to determine to which members of the updated communication group to send a command, wherein the second device satisfies the distribution criterion and wherein the second message comprises the command.

8. The method of claim 7, wherein the distribution criterion is a device identifier associated with the second device.

9. A method for transmitting messages, comprising:

sending, from a file server, a communication group membership message (CGMM) to a messaging server;

dynamically updating a communication group based on the CGMM to obtain an updated communication group, wherein each member the updated communication group is concurrently viewing a file, wherein each member of the updated communication group is a device;

receiving, by the messaging server, a message from a first member of the updated communication group; and transmitting a copy of the message to at least one member of the updated communication group, wherein the at least one member of the updated communication group is not the first member.

10. The method of claim 9, further comprising:

dynamically updating the updated communication group to obtain a second updated communication group, wherein membership of the second updated communication group is different than membership of the updated communication group;

receiving a second message from a first member of the second updated communication group; and transmitting a copy of the message to at least one member of the second updated communication group, wherein the at least one member of the second updated communication group is not the first member.

11. The method of claim 10, wherein at least one device is a member of the updated communication group and the second updated communication group.

12. A method for transmitting messages, comprising:

sending, from a file server, a communication group membership message (CGMM) to a messaging server;

dynamically updating a communication group based on the CGMM to obtain an updated communication group, wherein each member the updated communication group is concurrently executing an instance of an application, wherein each member of the updated communication group is a device;

receiving, by the messaging server, a message from a first member of the updated communication group; and transmitting a copy of the message to at least one member of the updated communication group, wherein the at least one member of the updated communication group is not the first member.

13. The method of claim 12, further comprising:

dynamically updating the updated communication group to obtain a second updated communication group, wherein membership of the second updated communication group is different than membership of the updated communication group;

receiving a second message from a first member of the second updated communication group; and transmitting a copy of the message to at least one member of the second updated communication group except the first member of the second updated communication group.

14. The method of claim 13, wherein at least one device is a member of the updated communication group and the second updated communication group.

15. A system, comprising:

a file server configured to:

receive a request to access a file by a first device;

provide the first device access to the file; and send a communication group membership message (CGMM) to a messaging server, wherein the CGMM comprises a first device ID associated with first device and a file ID associated with the file; and the messaging server configured to:

dynamically update a communication group to obtain an updated communication group using the CGMM, wherein the updated communication group comprises at least one other device concurrently accessing the file.

16. The system of claim 15, wherein the message server is further configured to:

receive a message from a first member of the updated communication group; and transmit a copy of the message to all members of the updated communication group except the first member of the communication group.

17. The system of claim 15, wherein the first device is an e-flipchart apparatus.

18. The system of claim 15, wherein the message server is further configured to:

receive a message comprising a distribution criterion from a first member of the updated communication group; and transmit a copy of the message to all members of the updated communication group, except the first member of the updated communication group, that satisfy the distribution criterion.

* * * * *